United States Patent
Wang et al.

(10) Patent No.: US 8,264,627 B2
(45) Date of Patent: Sep. 11, 2012

(54) LIQUID CRYSTAL DISPLAY PANEL AND DRIVING METHOD THEREOF AND LIQUID CRYSTAL DISPLAY DEVICE USING THE SAME

(75) Inventors: I-Fang Wang, Changhua County (TW); Wen-Chun Wang, Taichung (TW)

(73) Assignee: Wintek Corporation, Taichung (TW)

( * ) Notice: Subject to any disclaimer, the term of this patent is extended or adjusted under 35 U.S.C. 154(b) by 909 days.

(21) Appl. No.: 12/323,534

(22) Filed: Nov. 26, 2008

(65) Prior Publication Data

US 2009/0135324 A1 May 28, 2009

(30) Foreign Application Priority Data

Nov. 28, 2007 (TW) .............................. 96145129 A

(51) Int. Cl.
*G02F 1/1343* (2006.01)
(52) U.S. Cl. .............. 349/38; 349/37; 349/144
(58) Field of Classification Search ............ 349/37, 349/38, 42, 48, 144
See application file for complete search history.

(56) References Cited

U.S. PATENT DOCUMENTS

| | | | | |
|---|---|---|---|---|
| 5,757,444 A | * | 5/1998 | Takemura | 349/38 |
| 5,808,706 A | * | 9/1998 | Bae | 349/38 |
| 5,852,488 A | | 12/1998 | Takemura | |
| 7,973,897 B2 | | 7/2011 | Wang et al. | |
| 2002/0047822 A1 | * | 4/2002 | Senda et al. | 345/90 |
| 2007/0229430 A1 | | 10/2007 | Wang et al. | |

FOREIGN PATENT DOCUMENTS

| | | |
|---|---|---|
| JP | 2000241830 A | 9/2000 |
| JP | 2004118048 A | 4/2004 |
| TW | 538398 | 6/2003 |

OTHER PUBLICATIONS

First Office Action for U.S. Appl. No. 11/640,205 (now USP 7,973,897), (2010).
First Office Action for U.S. Appl. No. 12/244,525 (now abandoned), (2011).
First Office Action for U.S. Appl. No. 12/234,231, (2011).
Response to First Office Action for U.S. Appl. No. 12/234,231, (2012).

* cited by examiner

*Primary Examiner* — Michael Caley
(74) *Attorney, Agent, or Firm* — Muncy, Geissler, Olds & Lowe, PLLC

(57) ABSTRACT

A liquid crystal display panel including a data line, a first, a second and a third scan line, a first, a second and a third switch, and a first, a second and a third pixel electrode is provided. These scan lines are sequentially disposed next to each other. Each switch has a control end, an input end and an output end. These control ends are respectively coupled to these scan lines. These input ends are coupled to the data line. These output ends are respectively coupled to the pixel electrodes. A first extending electrode of the first pixel electrode is near the second pixel electrode, a second extending electrode of the second pixel electrode is near the third pixel electrode, and a third extending electrode of the third pixel electrode is near the first extending electrode.

18 Claims, 6 Drawing Sheets

LIQUID CRYSTAL DISPLAY PANEL AND DRIVING METHOD THEREOF AND LIQUID CRYSTAL DISPLAY DEVICE USING THE SAME

This application claims the benefit of Taiwan application Serial No. 96145129, filed Nov. 28, 2007, the subject matter of which is incorporated herein by reference.

BACKGROUND OF THE INVENTION

1. Field of the Invention

The invention relates in general to a liquid crystal display panel and a driving method thereof and a liquid crystal display device using the same, and more particularly to a liquid crystal display panel having an extending electrode extending to neighboring pixel electrode and a driving method thereof and a liquid crystal display device using the same.

2. Description of the Related Art

With the great popularity of consumer electronic products in recent years, a large variety of electronic products such as mobile phone, notebook computer and liquid crystal TV has become an indispensable part for modern people in their everyday life. Particularly, the thin display device using liquid crystal display panel, having the advantages of small size, low radiation and low power consumption, has gradually taken the place of conventional CRT display device and become the priority purchase choice for consumers to choose from. Moreover, along with the advance in manufacturing process and display quality, liquid crystal display has gained great popularity in the market and further boosted the demand for liquid crystal display panel. While expanding the production capacity, the manufacturers are also dedicated to the development of large-sized panel and to the improvement in the display quality of the liquid crystal display panel so as to meet consumers' increasingly requirements.

Liquid crystal display panel displays a frame of picture by utilizing the light birefringence effect from a liquid crystal layer. Because the phase differences of the incident light passing through the liquid crystal layer from different angles are different, the birefringence effect of the light, as well as the transmittance, from certain view angle is different from that of another. Thus, the greyscale luminances of the displayed light from different view angles differ from one another. When the lights of different colors (such as red light, green light and blue light) are mixed with different luminance ratios in the upright view direction and in the inclined view direction respectively, color shift that change display color tones from different view directions will occur. In order to solve the problem, numerous wide view-angle display techinques that reduce color shift from different view angles for liquid crystal display panels are developed to increase view angles thereof.

Among these wide-angle display techniques, a method of extending an auxiliary electrode from a pixel electrode to adjacent pixel electrode and making two adjacent pixel electrodes receive voltages of different polarities (such as the dot inversion driving method or the line inversion driving method) is implemented. By the fringe field effect, which is generated between the auxiliary electrode and the pixel electrode with different voltage polarities, the alignment of liquid crystal molecules is altered, hence achieving multiple domains and increasing the view angle of the liquid crystal display panel. Referring to FIGS. 1A and 1B, FIG. 1A shows an equivalent circuit diagram of a pixel having auxiliary electrode, and FIG. 1B shows a layout diagram of pixel electrode and auxiliary electrode. A first pixel 110(n) and a second pixel 110(n+1) from numerous pixels are taken for example here. The second pixel 110(n+1) is the next pixel of the first pixel 110(n), and the first tow pixels 110(n) and 110(n+1) correspond to voltages of different polarities. The first pixel 110(n) includes a first thin film transistor TFT1 and a first pixel electrode P10, and the second pixel 110(n+1) includes a second thin film transistor TFT2 and a second pixel electrode P20. The sources of the first thin film transistor TFT1 and the second thin film transistor TFT2 are coupled to the data line 130. The gates of the first thin film transistor TFT1 and the second thin film transistor TFT2 are respectively coupled to a first scan line 120(n) and a second scan line 120(n+1). The drains of the first thin film transistor TFT1 and the second thin film transistor TFT2 are respectively coupled to the first pixel electrode P10 and the second pixel electrode P20. The first pixel electrode P10 and the second pixel electrode P20 respectively form a first liquid crystal capacitor and a second liquid crystal capacitor with the common electrode of the liquid crystal display panel. The first pixel electrode P10 has an auxiliary electrode P11 extending towards the neighboring second pixel electrode P20. The auxiliary electrode P11 is extending to be near the second pixel electrode P20. The method of driving pixel includes the following steps. First, the first thin film transistor TFT1 is enabled for charging the first pixel electrode P10 to a corresponding data voltage. The first pixel 110(n) has a first voltage polarity at this moment. Next, the second thin film transistor TFT2 is enabled for charging the second pixel electrode P20 to a corresponding data voltage. The second pixel 110(n+1) has a second voltage polarity at this moment. When the first voltage has a positive polarity and the second voltage has a negative polarity, the capacitor coupling effect between the auxiliary electrode P11 and the second pixel electrode P20 will cause a voltage drop of the first pixel electrode P10.

A circuit simulation, which is controlled under the exemplary conditions of the voltage of the common electrode being switching between 0V and 5V, the voltage of the first pixel electrode P10 during the positive half-cycle being +5V and the voltage of the first pixel electrode P10 during the negative half-cycle being −5V, is conducted. According to circuit simulation result, after the second pixel electrode P20 is charged to a corresponding data voltage, the voltage difference between the first pixel electrode P10 and the common electrode is approximately decreased to 3.5V during the positive half-cycle and decreased to 4.5V during the negative half-cycle. In general, the capacitor coupling effect between the auxiliary electrode P11 and the second pixel electrode P20 distorts the voltage of the first pixel electrode P10 and leads to the greyscale shift of the first pixel 110(n).

SUMMARY OF THE INVENTION

The invention is directed to a liquid crystal display panel and a driving method thereof and a liquid crystal display device using the same. A coupling capacitor is formed between the pixel electrodes in pixels that correspond to the same voltage polarity to compensate the change of voltage difference of liquid crystal capacitor and to improve the greyscale shift of pixels.

According to the present invention, a liquid crystal display panel including at least one data line, a first scan line, a second scan line, a third scan line, a first switch, a second switch, a third switch, a first pixel electrode, a second pixel electrode and a third pixel electrode is provided. These scan lines are sequentially disposed next to each other. The first switch has a first control end, a first input end and a first output end. The second switch has a second control end, a second input end and a second output end. The third switch has a third control end, a third input end and a third output end. These control ends are respectively coupled to these scan lines. These input ends are respectively coupled to the data line. The first pixel electrode coupled to the first output end has a first extending electrode near the second pixel electrode. The second pixel electrode coupled to the second output end has a second extending electrode near the third pixel electrode. The third pixel electrode coupled to the third output end has a third extending electrode near the first extending electrode.

According to the present invention, a liquid crystal display device including a liquid crystal display panel, a data driver and a scan driver is provided. The liquid crystal display panel includes at least one data line, a first scan line, a second scan line, a third scan line, a first switch, a second switch, a third switch, a first pixel electrode, a second electrode, and a third pixel electrode. These scan lines are sequentially disposed next to each other. The first switch has a first control end, a first input end and a first output end. The second switch has a second control end, a second input end and a second output end. The third switch has a third control end, a third input end and a third output end. These control ends are respectively coupled to these scan lines. These input ends are coupled to the data line. The first pixel electrode coupled to the first output end has a first extending electrode near the second pixel electrode. The second pixel electrode coupled to the second output end has a second extending electrode near the third pixel electrode. The third pixel electrode coupled to the third output end has a third extending electrode near the first extending electrode. The data driver is coupled to the data line, and the scan driver is coupled to these scan lines.

According to the present invention, a liquid crystal display panel including a first pixel, a second pixel and a third pixel is provided. The first pixel includes a first switch and a first pixel electrode. The first switch has a first control end, a first input end and a first output end. The first control end is coupled to the first scan line. The first input end is coupled to the data line. The first pixel electrode coupled to the first output end has a first extending electrode. The second pixel adjacent to the first pixel includes a second switch and a second pixel electrode. The second switch has a second control end, a second input end and a second output end. The second control end is coupled to the second scan line. The second input end is coupled to the data line. The second pixel electrode coupled to the second output end has a second extending electrode. The first extending electrode is near the second pixel electrode. The third pixel adjacent to the second pixel includes a third switch and a third pixel electrode. The third switch has a third control end, a third input end and a third output end. The third control end is coupled to the third scan line. The third input end is coupled to the data line. The third pixel electrode coupled to the third output end has a third extending electrode. The second extending electrode is near the third pixel electrode, and the third extending electrode is near the first extending electrode.

According to the present invention, a driving method for a liquid crystal display panel is provided. The liquid crystal display panel includes a first pixel, a second pixel and a third pixel. These pixels are sequentially disposed next to each other. The first pixel includes a first switch and a first pixel electrode that is coupled to the first switch. The second pixel includes a second switch and a second pixel electrode that is coupled to the second switch. The third pixel includes a third switch and a third pixel electrode that is coupled to the third switch. A first extending electrode of the first pixel electrode is near the second pixel electrode. A second extending electrode of the second pixel electrode is near the third pixel electrode. A third extending electrode of the third pixel electrode is near the first extending electrode. The first pixel and the second pixel correspond to voltages of different polarities. The first pixel and the third pixel correspond to voltages of the same polarity. The driving method includes the following steps. First, the first switch is enabled for charging the first pixel electrode to a data voltage. Next, the second switch is enabled for changing the first pixel electrode to a first coupling voltage from the data voltage due to the coupling capacitor effect between the first extending electrode and the second pixel electrode. Then, the third switch is enabled for changing the first pixel electrode to a second coupling voltage from the first coupling voltage due to the coupling capacitor effect between the first extending electrode and the third extending electrode.

The invention will become apparent from the following detailed description of the preferred but non-limiting embodiments. The following description is made with reference to the accompanying drawings.

DETAILED DESCRIPTION OF THE INVENTION

Figure 1A:
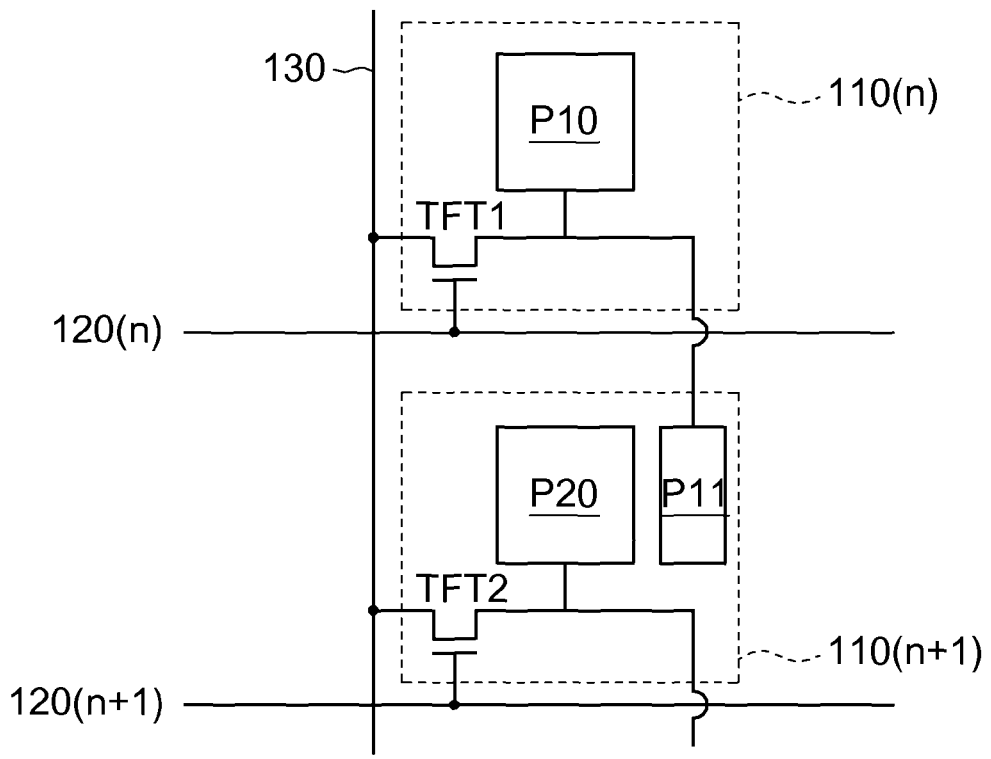
FIG. 1A (Prior Art) shows an equivalent circuit diagram of a pixel having auxiliary electrode.
Figure 1B:
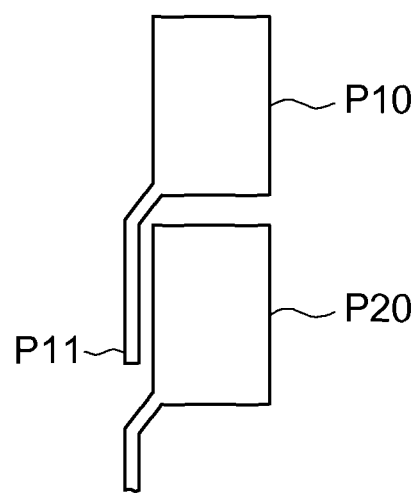
FIG. 1B (Prior Art) shows a layout diagram of pixel electrode and auxiliary electrode.

According to a liquid crystal display panel and a driving method thereof and a liquid crystal display device using the same of the preferred embodiment of the invention, the first pixel, the second pixel and the third pixel are exemplified by disposing next to each other and coupling to the same data line. The pixel electrode of the first pixel has a first extending electrode near the pixel electrode of the second pixel. The pixel electrode of the third pixel has a third extending electrode near the first extending electrode. When the switches in the pixels are sequentially enabled by different scan lines, the voltage of the pixel electrode of the first pixel will be shifted due to the coupling capacitor effect between the first extending electrode and the pixel electrode of the second pixel. The coupling capacitor effect between the third extending electrode and the first extending electrode is for compensating the voltage change in the pixel electrode of the first pixel. The invention is elaborated in a preferred embodiment. However, the present embodiment of the invention is only for exemplification but not for limiting the scope of protection of the invention. Moreover, unnecessary elements are omitted in the drawings of the embodiments to clearly show the technical features of the invention.

Liquid Crustal Display Device

Figure 2:
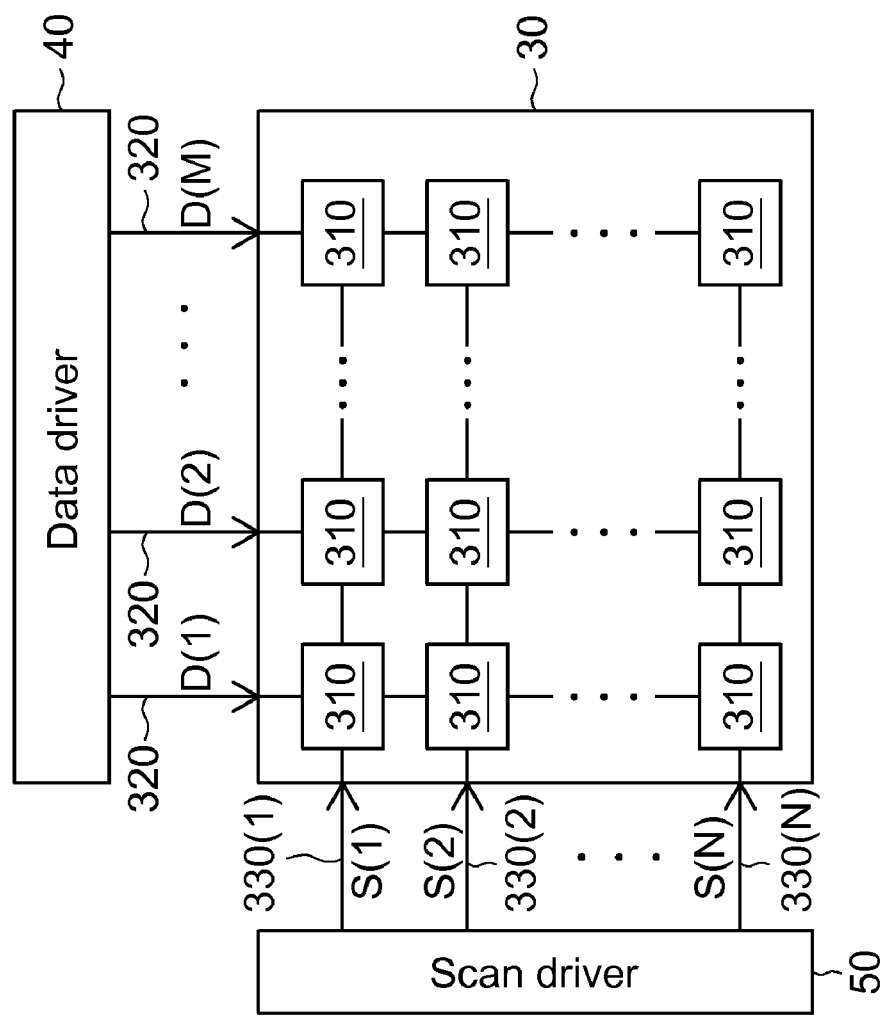
FIG. 2 shows a perspective of a liquid crystal display device.

Referring to FIG. 2, a perspective of a liquid crystal display device is shown. The liquid crystal display device 20 includes a liquid crystal display panel 30, a data driver 40 and a scan driver 50. The liquid crystal display panel includes a plurality of pixels 310, at least one data line 320 and a plurality of scan lines 330(1) to 330(N). The data driver 40 is coupled to the data line 320 and outputs corresponding data signals D(1) to D(M) to the pixels 310 via the data line 320. The scan driver 50 is coupled to the scan lines 330(1) to 330(N) and outputs the scan signals S(1) to S(N) via the scan lines 330(1) to 330(N) to sequentially enable the pixels 310 in each row.

Equivalent Circuit Diagram of Pixels

Figure 3:
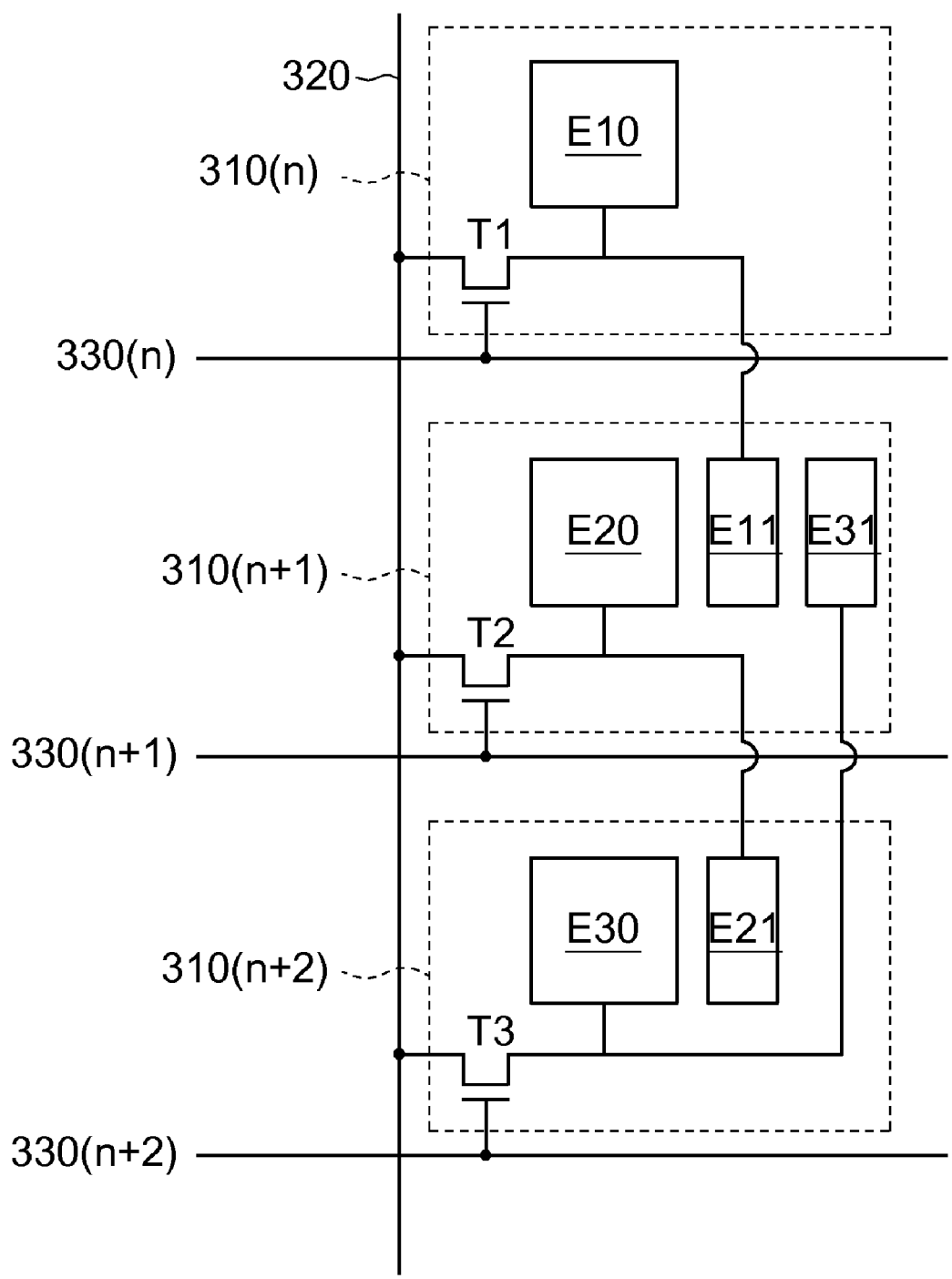
FIG. 3 shows an equivalent circuit diagram of a first, a second and a third pixel sequentially disposed next to each other according to the preferred embodiment of the invention.
Figure 4:
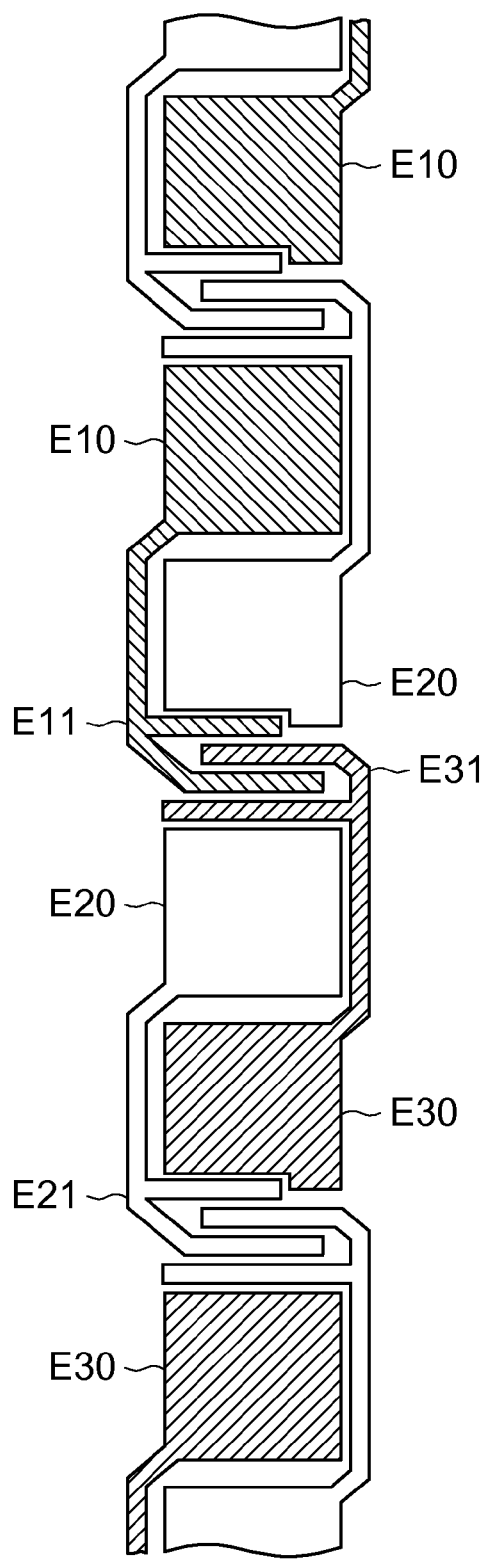
FIG. 4 shows a layout diagram of the first pixel electrode, the second pixel electrode and the third pixel electrode.

The pixels 310 include a first pixel, a second pixel and a third pixel. In the present embodiment of the invention, the first, the second and the third pixel are exemplified by coupling to the same data line and sequentially disposing next to each other. Referring to both FIG. 3 and FIG. 4, FIG. 3 shows an equivalent circuit diagram of the first, the second and the third pixel sequentially disposed next to each other according to the preferred embodiment of the invention, and FIG. 4 shows a layout diagram of the first pixel electrode, the second pixel electrode and the third pixel electrode. The first pixel 310(n), the second pixel 310(n+1) and the third pixel 310(n+2) among the pixels 310 are sequentially disposed next to each other and coupled to the same data line 320. Moreover, the first pixel 310(n) and the second pixel 310(n+1) correspond to different voltage polarities, yet the first pixel 310(n) and the third pixel 310(n+2) correspond to the same voltage polarity. The first pixel 310(n) includes a first switch T1 and a first pixel electrode E10. The first switch T1 has a first control end, a first input end and a first output end. The second pixel 310(n+1) includes a second switch T2 and a second pixel electrode E20. The second switch T2 has a second control end, a second input end and a second output end. The third pixel 310(n+2) includes a third switch T3 and a third pixel electrode E30. The third switch T3 has a third control end, a third input end and a third output end. In the present embodiment of the invention, the first, the second and the third switch T1, T2 and T3 are exemplified by thin film transistors (TFTs). The first, the second and the third control end are the gates of the TFTs; the first, the second and the third input end are the sources of the TFTs; and the first, the second and the third output end are the drains of the TFTs. The first control end is coupled to a first scan line 330(n) among the scan lines 330(1) to 330(N). The second control end is coupled to a second scan line 330(n+1) among the scan lines 330(1) to 330(N). The third control end is coupled to a third scan line 330(n+2) among the scan lines 330(1) to 330(N). The first, the second and the third input end are individually coupled to the data line 320. The first, the second and the third output end are respectively coupled to the first pixel electrode E10, the second pixel electrode E20 and the third pixel electrode E30.

The first pixel electrode E10 has a first extending electrode E11, the second pixel electrode E20 has a second extending electrode E21, and the third pixel electrode E30 has a third extending electrode E31. The first extending electrode Ell is near the second pixel electrode E20, the second extending electrode E21 is near the third pixel electrode E30, and the third extending electrode E31 is near the first extending electrode E11. More specifically, as can be clearly seen in FIG. 4, each of the first pixel electrode E10, the second pixel electrode E20 and the third pixel electrode E30 may have two extending electrodes. Taking the second pixel electrode E20 as an example, one of the second extending electrodes E21 of the second pixel electrode E20 extends upwardly to a position near the first pixel electrode E10, and the other one of the second extending electrodes E21 extends downwardly to a position near the third pixel electrode E30. Further, one of the first extending electrodes E11 of the first pixel electrode E10 extends downwardly to a position near the second pixel electrode E20, and one of the third extending electrodes E31 of the third pixel electrode E30 extends upwardly to a position near one of the first extending electrodes E11 of the first pixel electrode E10. Besides, liquid crystal capacitors respectively corresponding to each pixel 310(n), 310(n+1) and 310(n+2) are formed between each of the pixel electrodes E10, E20 and E30 and the common electrode of the liquid crystal display panel 30. As indicated in FIG. 4, the first, the second and the third extending electrode E11, E21 and E31 are respectively extended to be near the prior pixel and the next pixel from diagonal corners of the first, the second and the third pixel electrode E10, E20 and E30. In the present embodiment of the invention, the third extending electrode E31 is further extended to be near the first extending electrode E11. The first, the second and the third extending electrode E11, E21 and E31 are separately exemplified by an F-shaped structure. However, anyone who has ordinary skills in the technology field of the invention will understand that the technology of the invention is not limited thereto. On the contrary, any other shapes or types of extending electrode design are applicable to the invention. The present embodiment of the invention is exemplified by the first, the second and the third pixel 310(n), 310(n+1) and 310(n+2); however, in practical application, the first extending electrode E11 can be further extended to be near the extending electrode of the prior pixel electrode that receives voltage of the same polarity, and the third extending electrode E31 can be further extended to be near the extending electrode of the next pixel electrode that receives voltage of the same polarity. Further, the common electrode is used for providing a common voltage, which is exemplified as an alternate-current-driven common electrode (ACVcom) in the present embodiment of the invention. The exemplificative driving mode of the liquid crystal display panel 30 is row inversion, dot inversion or other driving mode where neighboring pixels correspond to voltage of different polarities.

Driving Method For Liquid Crustal Display Panel

Figure 5:
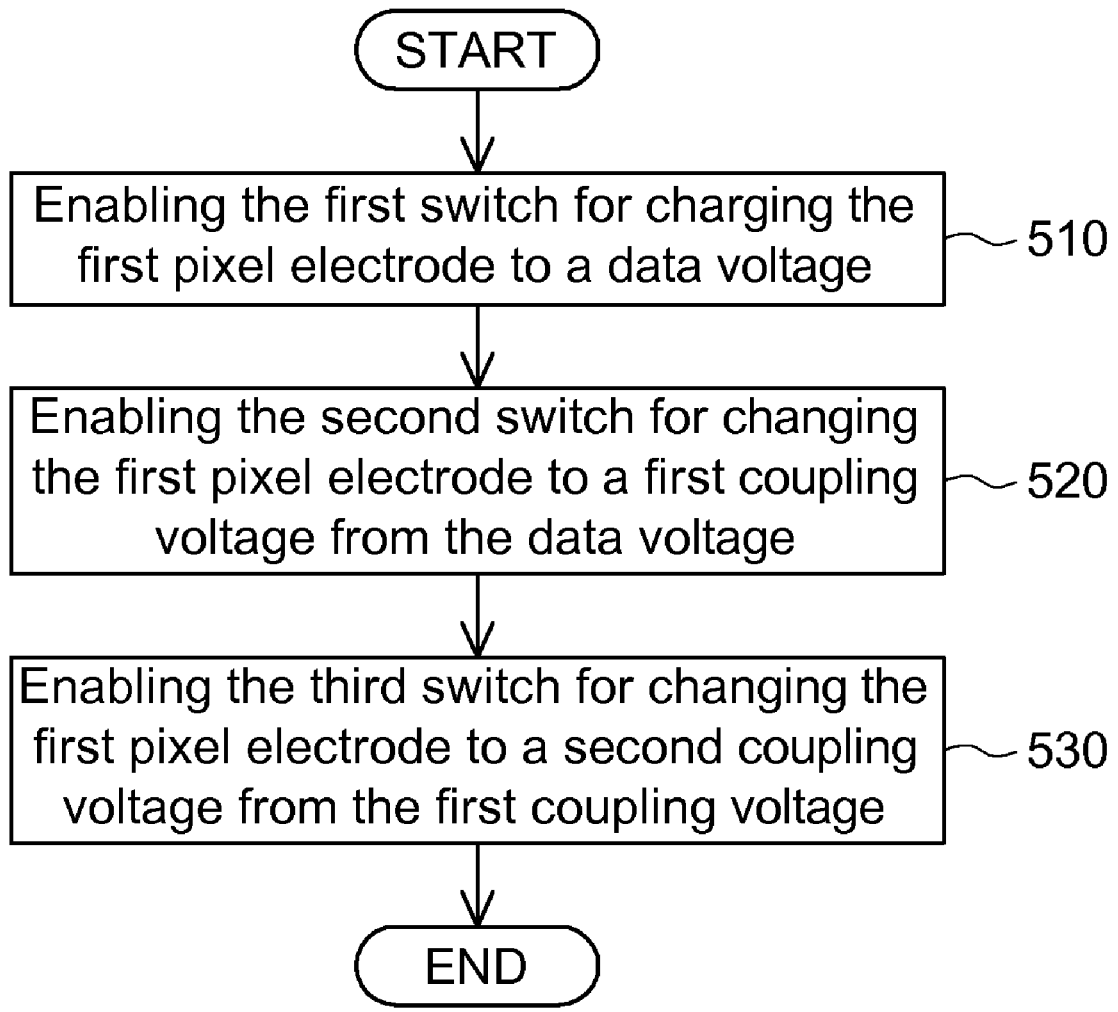
FIG. 5 shows a flowchart of a driving method for driving the liquid crystal display panel according to a preferred embodiment of the invention.

The liquid crystal display panel 30 can be driven in accordance with the driving method of a preferred embodiment of the invention. Referring to both FIG. 3 and FIG. 5, FIG. 5 is a flowchart of a driving method for driving the liquid crystal display panel according to a preferred embodiment of the invention.

First, a first switch T1 is enabled as indicated in step 510. The first switch T1 is enabled by the first scan line 330(n) via the first control end for charging the first pixel electrode E10 to a first data voltage.

Next, the driving method proceeds to step 520, a second switch T2 is enabled. The second switch T2 is enabled by the second scan line 330(n+1) via the second control end for charging the second pixel electrode E20 to a second data voltage. Due to the different voltage polarities of the first pixel 310(n) and the second pixel 310(n+1), the voltage of first pixel electrode E10 is changed to a first coupling voltage from the first data voltage due to the coupling capacitor effect between the first extending electrode E11 and the second pixel electrode E20. For example, when the first pixel 310(n) corresponds to a voltage of positive polarity and the second pixel 310(n+1) corresponds to a voltage of negative polarity, the first pixel electrode E10 steps down to the first coupling voltage from the first data voltage.

Then, the driving method proceeds to step 530, a third switch T3 is enabled. The third switch T3 is enabled by the third scan line 330(n+2) via the third control end for charging the third pixel electrode to a third data voltage. Due to the same voltage polarity of the first pixel 310(n) and the third pixel 310(n+2), the voltage of the first pixel electrode E10 is changed to a second coupling voltage from the first coupling voltage due to the coupling capacitor effect between the first extending electrode E11 and the third extending electrode E31. For example, when the first pixel 310(n) and the third pixel 310(n+2) correspond to voltages of positive polarity, the first pixel electrode E10 is boosted to the second coupling voltage from the first coupling voltage. Thus, the voltage of the first pixel electrode E10 is close to the initial first data voltage, and the voltage loss caused by the coupling capacitor effect between the first extending electrode E11 and the second pixel electrode E20 is compensated.

Circuit Simulation Result

Figure 6:
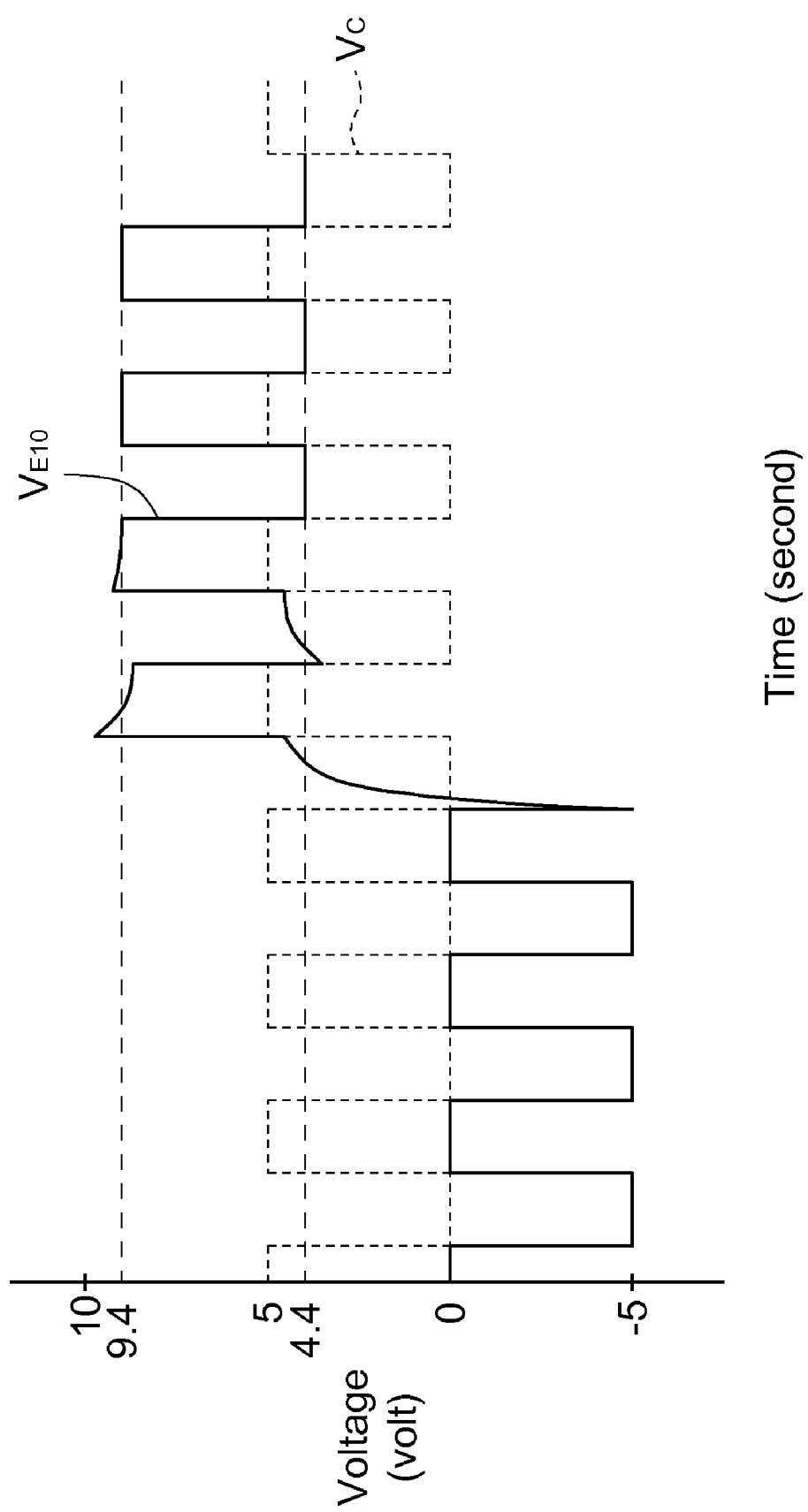
FIG. 6 shows a signal waveform diagram of the first pixel in FIG. 3.

The simulation results of the liquid crystal display panel 30 of a preferred embodiment of the invention are elaborated below. Referring to FIG. 6, a signal waveform diagram of the first pixel in FIG. 3 is illustrated. In FIG. 6, $V_{E10}$ denotes the voltage value of the first pixel electrode E10, and $V_C$ denotes the voltage value of the common electrode. In the present embodiment of the invention, the common electrode is a common electrode driven by an alternate current power, and the common voltage $V_C$ switches between 0V and 5V according to a time period. The initial value of the first data voltage of the first pixel electrode E10 is 5V. According to the simulation results, after the third switch T3 is enabled, the voltage difference between the voltage value of the first pixel electrode $V_{E10}$ and the voltage value of the common electrode $V_C$ is kept at around 5V during the negative half-cycle, and the voltage difference is kept at around 4.4V during the positive half-cycle. Compared with the voltage difference between the first pixel electrode P10 (illustrated in FIG. 1A) of the first pixel 110(n) and the common electrode (in a conventional liquid crystal display panel, the voltage difference is 4.5V during the negative half-cycle and 3.5V during the positive half-cycle), the voltage difference between the first pixel electrode E10 and the common electrode in the liquid crystal display panel 30 of the present embodiment of the invention can be effectively compensated.

The liquid crystal display panel 30 of the preferred embodiment of the invention is exemplified by including a first pixel 310(n), a second pixel 310(n+1) and a third pixel 310(n+2), and the coupling capacitor effect between the first extending electrode E11 and the third extending electrode E31 is used to compensate the loss of voltage in the first pixel electrode E10. However, in practical application, each pixel electrode in the display panel 30 can have an extending electrode extended to the neighboring pixel electrode of the same voltage polarity. Therefore, the voltage loss of each pixel electrode caused by the coupling capacitor effect between the pixel electrodes of different voltage polarities can be compensated through the coupling capacitor effect between pixel electrodes of the same voltage polarity. Consequently, the grayscale shift of pixels is improved, and the overall display quality of the liquid crystal display panel 30 is enhanced.

According to the liquid crystal display panel and the driving method thereof and the liquid crystal display device using the same disclosed in the above embodiment of the invention, the coupling capacitor effect between the first extending electrode of the first pixel electrode and the third extending electrode of the third pixel electrode is used to compensate voltage distortion, so that the grayscale shift of pixels is improved and the overall display quality of the liquid crystal display device is enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display panel, comprising:
a data line;
a first scan line, a second scan line and a third scan line, wherein the first scan line, the second scan line and the third scan line are sequentially disposed next to each other;
a first switch having a first control end, a first input end and a first output end, wherein the first control end is coupled to the first scan line, and the first input end is coupled to the data line;
a second switch having a second control end, a second input end and a second output end, wherein the second control end is coupled to the second scan line, and the second input end is coupled to the data line;
a third switch having a third control end, a third input end and a third output end, wherein the third control end is coupled to the third scan line, and the third input end is coupled to the data line;
a first pixel electrode coupled to the first output end and having at least two first extending electrodes;
a second pixel electrode coupled to the second output end and having at least two second extending electrodes, wherein one of the first extending electrodes extends to a position near the second pixel electrode; and
a third pixel electrode coupled to the third output end and having at least two third extending electrodes, wherein one of the second extending electrodes extends to a position near the first pixel electrode, the other one of the second extending electrodes extends to a position near the third pixel electrode, and one of the third extending electrodes extends to a position near one of the first extending electrodes.

2. The liquid crystal display panel according to claim 1, wherein the first pixel electrode and the second pixel electrode receive voltages of different polarities, and the first pixel electrode and the third pixel electrode receive voltages of the same polarity.

3. The liquid crystal display panel according to claim 2, wherein when the third scan line enables the third switch, the first pixel electrode changes to a second voltage from a first voltage due to the coupling capacitor effect between the first extending electrode and the third extending electrode.

4. The liquid crystal display panel according to claim 3, wherein when the first and the third pixel electrode receive voltages of positive polarity and the second pixel electrode receives voltage of negative polarity, the second voltage is substantially larger than the first voltage.

5. The liquid crystal display panel according to claim 3, wherein when the first and the third pixel electrode receive voltages of negative polarity and the second pixel electrode receives voltage of positive polarity, the first voltage is substantially larger than the second voltage.

6. The liquid crystal display panel according to claim 1, wherein the first switch, the second switch and the third switch are thin film transistors (TFTs).

7. A liquid crystal display device, comprising:
a liquid crystal display panel, comprising:
a data line;
a first scan line, a second scan line and a third scan line, wherein the first scan line, the second scan line and the third scan line are sequentially disposed next to each other;

a first switch having a first control end, a first input end and a first output end, wherein the first control end is coupled to the first scan line, and the first input end is coupled to the data line;

a second switch having a second control end, a second input end and a second output end, wherein the second control end is coupled to the second scan line, and the second input end is coupled to the data line;

a third switch having a third control end, a third input end and a third output end, wherein the third control end is coupled to the third scan line, and the third input end is coupled to the data line;

a first pixel electrode coupled to the first output end and having at least two first extending electrodes;

a second pixel electrode coupled to the second output end and having at least two second extending electrodes, wherein one of the first extending electrodes extends to a position near the second pixel electrode; and a third pixel electrode coupled to the third output end and having at least two third extending electrodes, wherein one of the second extending electrodes extends to a position near the first pixel electrode, the other one of the second extending electrodes extends to a position near the third pixel electrode, and one of the third extending electrodes extends to a position near one of the first extending electrodes;

a data driver coupled to the data line; and a scan driver coupled to the first scan line, the second scan line and the third scan line.

8. The liquid crystal display panel according to claim 7, wherein the first pixel electrode and the second pixel electrode receive voltages of different polarities, and the first pixel electrode and the third pixel electrode receive voltages of the same polarity.

9. The liquid crystal display device according to claim 8, wherein when the third scan line enables the third switch, the first pixel electrode changes to a second voltage from a first voltage due to the coupling capacitor effect between the first extending electrode and the third extending electrode.

10. The liquid crystal display device according to claim 9, wherein when the first and the third pixel electrode receive voltages of positive polarity and the second pixel electrode receive voltage of negative polarity, the second voltage is substantially larger than the first voltage.

11. The liquid crystal display device according to claim 9, wherein when the first and the third pixel electrode receive voltages of negative polarity and the second pixel electrode receives a voltage of positive polarity, the first voltage is substantially larger than the second voltage.

12. The liquid crystal display device according to claim 7, wherein the first switch, the second switch and the third switch are TFTs.

13. A liquid crystal display panel, comprising:

a first pixel, comprising:

a first switch having a first control end, a first input end and a first output end, wherein the first control end is coupled to a first scan line, and the first input end is coupled to a data line; and a first pixel electrode coupled to the first output end and having at least two first extending electrodes;

a second pixel adjacent to the first pixel, wherein the second pixel comprises:

a second switch having a second control end, a second input end and a second output end, wherein the second control end is coupled to a second scan line, and the second input end is coupled to the data line; and a second pixel electrode coupled to the second output end and having at least two second extending electrodes, wherein one of the first extending electrodes extends to a position near the second pixel electrode; and a third pixel adjacent to the second pixel, wherein the third pixel comprises:

a third switch having a third control end, a third input end and a third output end, wherein the third control end is coupled to a third scan line, and the third input end is coupled to the data line; and a third pixel electrode coupled to the third output end and having at least two third extending electrodes, wherein one of the second extending electrodes extends to a position near the first pixel electrode, the other one of the second extending electrodes extends to a position near the third pixel electrode, and one of the third extending electrodes extends to a position near one of the first extending electrodes.

14. The liquid crystal display panel according to claim 13, wherein the first pixel electrode and the second pixel electrode receive voltages of different polarities, and the first pixel electrode and the third pixel electrode receive voltages of the same polarity.

15. The liquid crystal display panel according to claim 14, wherein when the third scan line enables the third switch, the first pixel electrode changes to a second voltage from a first voltage due to the coupling capacitor effect between the first extending electrode and the third extending electrode.

16. The liquid crystal display panel according to claim 15, wherein when the first and the third pixel electrode receive voltages of positive polarity and the second pixel electrode receives voltage of negative polarity, the second voltage is substantially larger than the first voltage.

17. The liquid crystal display panel according to claim 15, wherein when the first and the third pixel electrode receive voltages of negative polarity and the second pixel electrode receives voltage of positive polarity, the first voltage is substantially larger than the second voltage.

18. The liquid crystal display panel according to claim 13, wherein the first switch, the second switch and the third switch respectively are TFTs.

* * * * *